United States Patent

Ueyoko

[11] Patent Number: 5,885,387
[45] Date of Patent: Mar. 23, 1999

[54] PNEUMATIC TIRE HAVING ENDLESS CARCASS CORD PLY

[75] Inventor: Kiyoshi Ueyoko, Kobe, Japan

[73] Assignee: Sumitomo Rubber Industries, LTD., Hyogo-ken, Japan

[21] Appl. No.: 760,563

[22] Filed: Dec. 4, 1996

[30] Foreign Application Priority Data

Dec. 8, 1995 [JP] Japan ................................. 7-320707
Dec. 8, 1995 [JP] Japan ................................. 7-320708

[51] Int. Cl.$^6$ ....................................................... B60C 9/02
[52] U.S. Cl. ...................... 152/540; 152/545; 152/548; 152/550; 152/552; 152/554; 152/558; 156/117; 156/133
[58] Field of Search ................................. 152/539, 540, 152/545, 548, 550, 551, 552–554, 558–560, 563, 533; 156/117, 130.7, 133, 136, 135

[56] References Cited

U.S. PATENT DOCUMENTS

| | | | |
|---|---|---|---|
| 3,024,828 | 3/1962 | Smith et al. | 152/533 |
| 3,424,220 | 1/1969 | Schuerch | 152/563 |
| 3,789,899 | 2/1974 | Kobayashi | 152/540 |
| 3,815,652 | 6/1974 | Pouilloux | 152/548 |
| 4,830,781 | 5/1989 | Oswald | 152/548 |
| 4,929,292 | 5/1990 | Holroyd et al. | 156/136 |
| 5,344,514 | 9/1994 | Siegenthaler | 156/117 |
| 5,394,920 | 3/1995 | Siegenthaler | 156/117 |

FOREIGN PATENT DOCUMENTS

| | | | |
|---|---|---|---|
| 467277 | 1/1992 | European Pat. Off. | 152/545 |
| 489353 | 6/1992 | European Pat. Off. | 156/117 |
| 417102 | 11/1910 | France . | |
| 1328752 | 4/1963 | France | 152/540 |
| 2132509 | 11/1972 | France . | |
| 2408474 | 8/1975 | Germany . | |
| 2410685 | 9/1975 | Germany . | |
| 58-105806 | 6/1983 | Japan | 152/545 |
| 6-156022 | 6/1994 | Japan | 152/539 |
| 2179009 | 2/1987 | United Kingdom . | |

*Primary Examiner*—Geoffrey L. Knable
*Attorney, Agent, or Firm*—Birch, Stewart, Kolasch & Birch, LLP

[57] ABSTRACT

A a carcass has at least one endless carcass cord ply, which is formed by at least one carcass cord extending zigzag in the tire's circumferential direction while being folded at both outer ends of the endless carcass cord ply alternately to right and left. The bead core has an upper bead core portion which is formed by a bead cord being substantially continuous to the carcass cord and spirally wound on the endless carcass cord ply in one or more stages in the tire's circumferential direction.

6 Claims, 21 Drawing Sheets

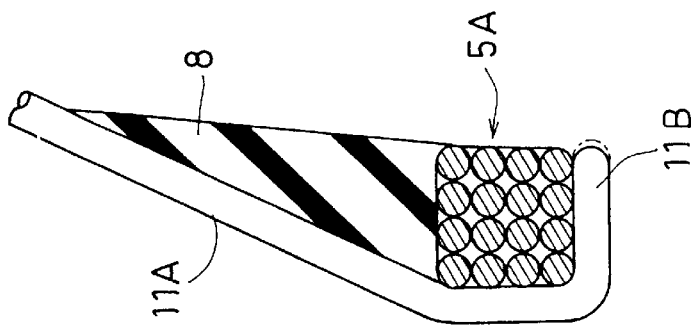
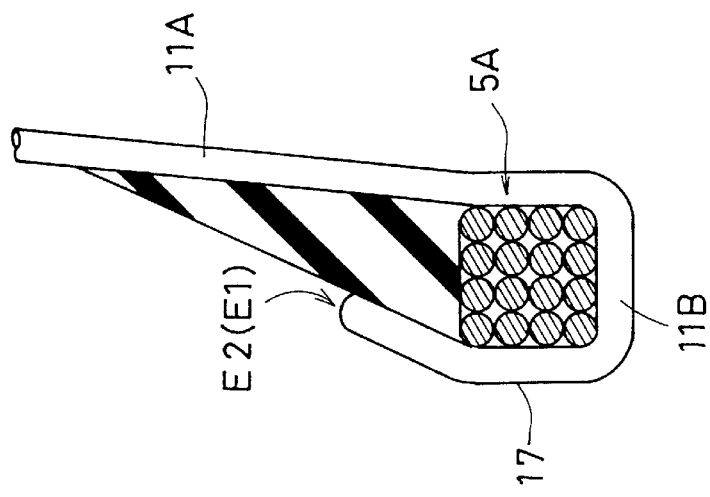
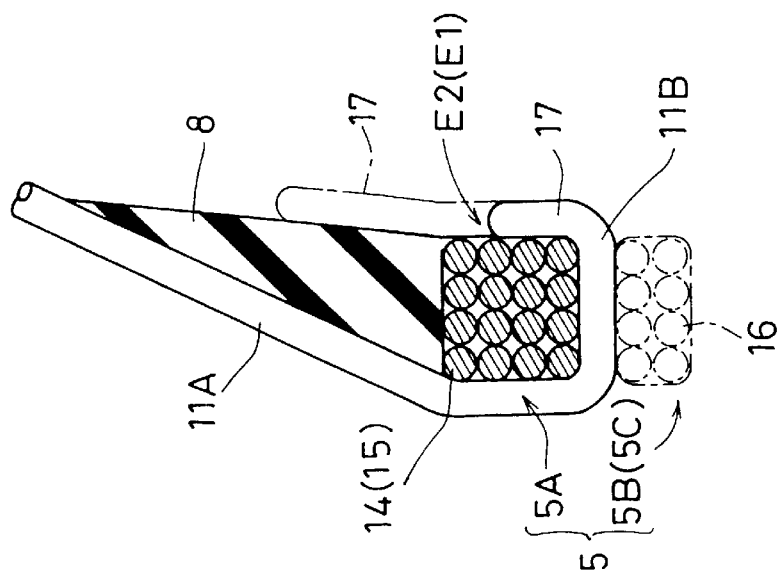

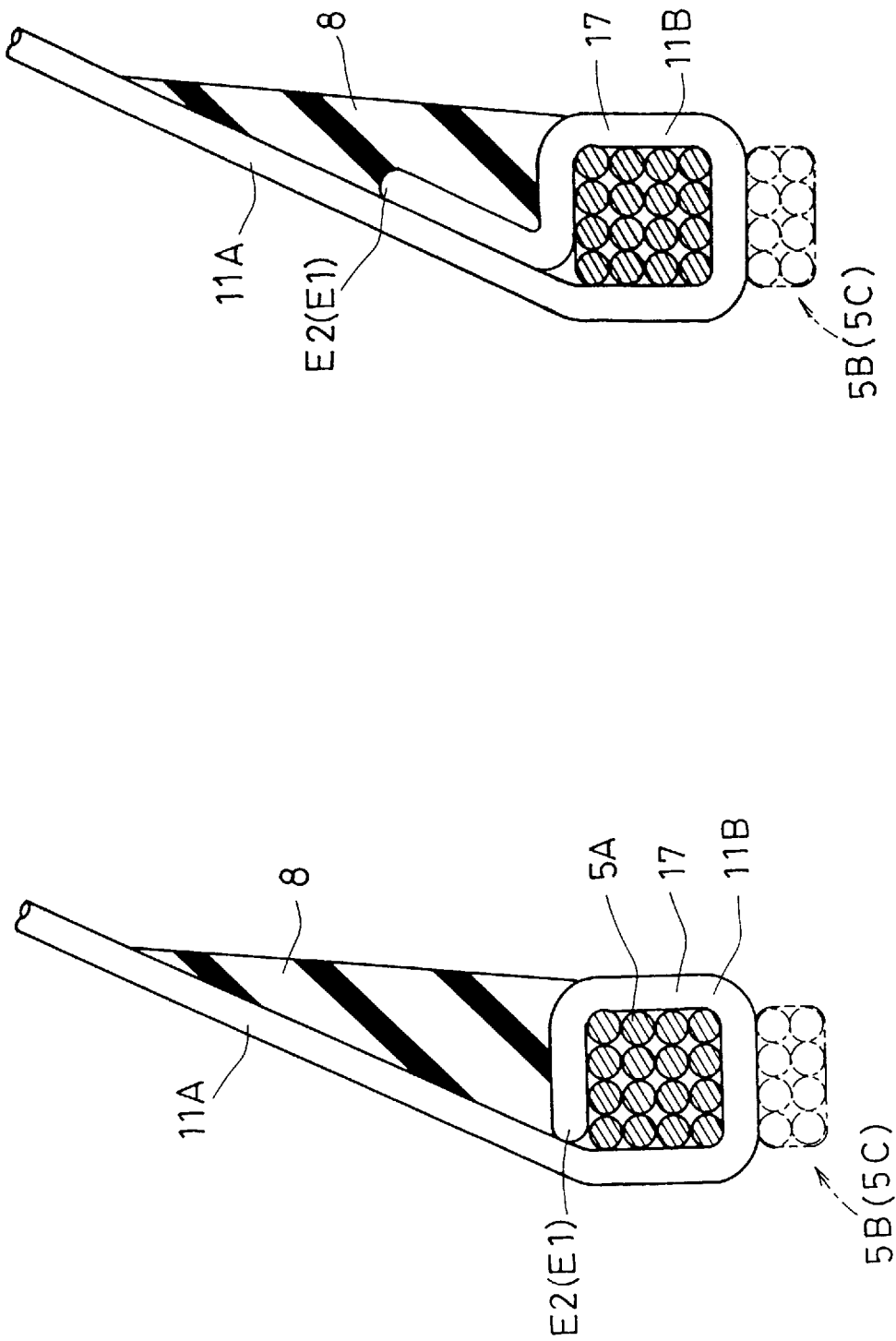

PNEUMATIC TIRE HAVING ENDLESS CARCASS CORD PLY

BACKGROUND OF THE INVENTION

The present invention relates to a pneumatic tire heightened in bead durability and reduced in weight, and its manufacturing method.

FIELD OF THE INVENTION

In various pneumatic tires for passenger car or heavy duty vehicle, generally, both ends of the carcass are fixed by turning up around the bead core. The turned up height of the carcass is usually set higher than the rim flange height in order to fix securely by preventing the carcass from blowing through against the internal inflating pressure or load weight.

When the pneumatic tire contacts the ground, however, it is deformed, as shown in FIG. 20, so that the portion 100 of the bead above the rim flange 104 is tilted axially outwardly, and therefore the stress of bending and compressing acts repeatedly in the turned up portion 102 of the carcass ply 101, and this stress is concentrated on the outer end of the turned up portion 102. At the outer end of the turned up portion 102, since the carcass cord is interrupted as cutting section, its adhesion with the surrounding rubber is inferior, and together with the stress concentration, looseness between the cord and rubber occurs early at the outer end of the turned up portion 102. And it may initiate progress into separation of carcass 101, and the bead damage is likely to occur. In particular, such bead damage tends to occur in the tire of radial structure heightened in the degree of deformation of the bead to the contrary due to increase of rigidity of the tread, or the tire for heavy load vehicle heavy in the load weight and large in the deformation of the tire itself.

To avoid such damage, hitherto, the rubber quantity of the bead apex rubber was increased to heighten the cushioning performance or extend the time to reach looseness, or cord reinforcing layers were provided around the bead core 103, inside and outside of the turned up portion 102 to increase the rigidity of the bead 100 to decrease the amount of deformation itself, among other measures.

Such measures were, however, insufficient in the damage preventive effect especially in the tire for heavy load, and further due to increase of volume of the bead, the tire weight was increased and the fuel economy was spoiled.

As a result of intensive studies in the light of such background, the present inventor discovered that the bead durability can be substantially increased, thereby contributing to reduction of weight, by using a endless carcass cord ply having a carcass cord arranged zigzag by folding in U-form sequentially at both ends of the ply, and forming bead cores by spirally winding a bead cord substantially continuous to the carcass cord. To form the pneumatic tire of such structure, still more, a novel manufacturing method of tire is also needed.

SUMMARY OF THE INVENTION

It is hence a first object of the invention to present a pneumatic tire and its manufacturing method capable of enhancing the adhesion of cord and rubber at both ends of a carcass ply, decreasing and dispersing the stress acting on both ends of the ply, substantially increasing the bead durability, and contributing to reduction of weight.

It is a second object to present a pneumatic tire and its manufacturing method capable of enhancing the strength of a bead core particularly, employing a low modulus cord in a carcass ply and an upper bead core portion.

It is a third object to present a pneumatic tire and its manufacturing method having a turned-up structure of carcass ply capable of further enhancing the improving effect of bead durability while promoting the weight reduction of tire. According to one aspect of the present invention, a pneumatic tire comprises a carcass extending from a tread through side-walls to a bead core in each of two bead parts and having at least one endless carcass cord ply, said endless carcass cord ply provided with a multiplicity of folding points arranged in the tire's circumferential direction at both outer ends of the endless carcass cord ply, and formed by at least one carcass cord extending zigzag in the tire's circumferential direction while being folded around the respective folding points of the both outer ends alternately to right and left, and said bead core having an upper bead core portion disposed radially outside said endless carcass cord ply in the bead part and formed by an upper bead cord being substantially continuous to said carcass cord and spirally wound in one or more stages in the tire's circumferential direction.

The endless carcass cord ply is preferable to have a parallel cord arrangement in a ply main portion straddling between the bead cores.

The bead core may have a lower bead core portion formed by a lower bead cord being either substantially continuous to or discontinuous to said carcass cord and spirally wound in the tire's circumferential direction.

The outer end of the endless carcass cord ply may be terminated inside of the bead core or substantially terminated on a radially inner surface of the bead core, or projected from the bead core in the tire axial direction so as to form a project portion. The project portion may be turned up radially outwardly and terminated on an axially outer surface of the bead core or a bead apex rubber. Or the project portion may be turned up radially outwardly and extend between the bead core and the bead apex rubber, and terminated between the bead core and the bead apex rubber or on an axially inner surface of the bead apex rubber.

In the second invention, a manufacturing method of pneumatic tire comprising an inner liner mounting step of rolling an inner liner rubber sheet on an outer circumference of a principal tire former in a cylindrical form and expandable in a toroidal form;

a carcass ply forming step of forming a tubular ply base body for carcass ply by turning, in the circumferential direction, a carcass cord on the outer circumference of the inner liner rubber sheet while folding alternately to right and left at both sides of the principal tire former;

a bead forming step of forming a bead core by spirally winding a bead cord substantially continuous to the carcass cord in a small width in one or more stages at both sides of the ply base body;

a junction step of mutually joining the tire forming member containing a bead apex rubber to the ply base body provided with the bead core; and an inflation step of inflating the principal tire former to obtain a raw cover tire.

In the carcass ply forming step, it is preferable to arrange the carcass cord substantially parallel in a ply main portion extending between the bead cores.

The inflation step may include a side-wall forming step of jointing side-wall rubbers by inflation of side formers provided at both sides of the principal tire former.

When the bead core have a lower bead core portion and an upper bead core portion, the lower bead core portion may be formed by spirally winding a lower bead cord continuous or not continuous to the carcass cord prior to the carcass ply forming step.

The bead forming step may form the bead core such that the side end of the ply base body is aligned with the axially outside surface of the bead core, or aligned withheld inward from the axially outside surface of the bead core, or projected from the axially outside surface of the bead core.

BRIEF DESCRIPTION OF THE DRAWINGS

An embodiment of the present invention will now be described, by way of example, referring to the attached diagrammatic drawings, in which:

FIGS. 9(A) to 9(C) are schematic sectional views showing examples of bead structure that can be formed by the invention.

FIGS. 11(A) and 11(B) are schematic sectional views showing different examples of bead structure that can be formed by the invention.

DETAILED DESCRIPTION OF THE INVENTION

Figure 1:
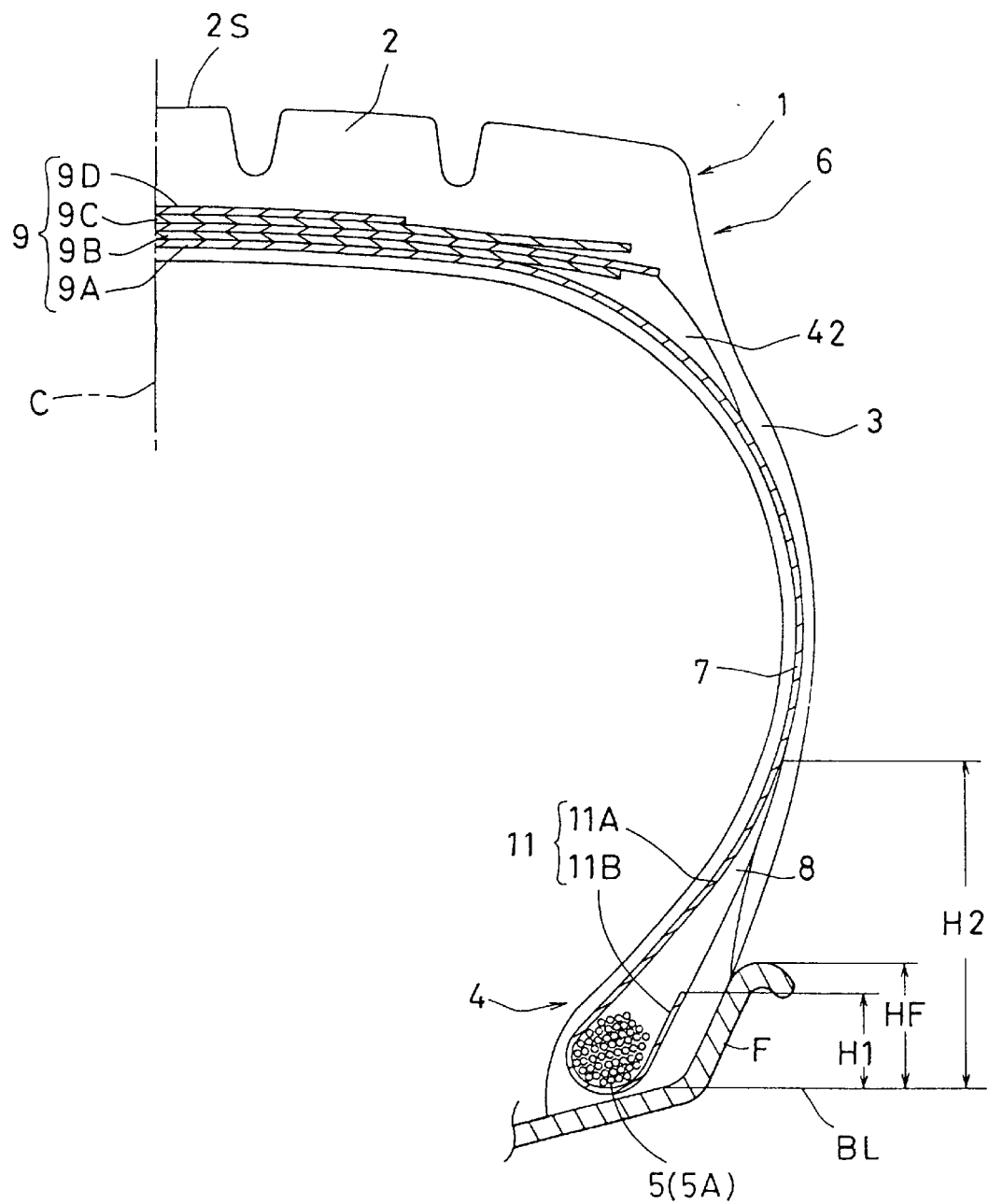
FIG. 1 is a sectional view showing an embodiment of a pneumatic tire formed by a manufacturing method of the invention.

FIG. 1 shows a pneumatic tire 1 as a radial tire for heavy duty vehicle in this embodiment, wherein the tire 1 has a toroidal tire base body 6 comprising a tread 2, side walls 3 extending radially inward from both ends of the tread 2, and bead parts 4 positioned at an inner end of both side walls 3 and reinforced by an annular bead core 5. The tire 1, also, has a carcass 7 extending along the tire main body 6 and a tough belt layer 9 disposed radially outside the carcass 6.

The belt layer 9 is composed of at least one belt ply, or, in this embodiment, first, second, third and fourth belt plies 9A to 9D arranged sequentially on the carcass in this order. The first belt ply 9A has a belt cord arranged, for example, at an angle of about 60 to 70 degrees to the tire's equator C, and the second, third and fourth belt plies 9B to 9D have belt cords arranged at angles of about 10 to 25 degrees. Incidentally, between the second and third belt plies 9B, 9C, the directions of the cord inclination to the tire's equator C are different to form a truss structure, which increases the belt rigidity, and reinforces the tread 2 by a strong hoop effect.

The belt cords may be composed of, for example, steel, aromatic polyamide, aromatic polyester, high elasticity polyethylene, and other high modulus fiber cords. Each belt cord is cut off and interrupted at the ply outer end, and, for example, the first belt ply 9A is nearly same in width as the third belt ply 9C, and is narrower than the second belt ply 9B, so that the outer end positions are different. The fourth belt ply 9D of the minimum width functions also as the breaker for protecting the inside belt plies 9A to 9C and the carcass 7. The both ends of the belt layer 9 are gradually departed from the carcass 7, and this space is filled with a relatively soft rubber cushion 42.

The carcass 7 is composed of at least one, in this embodiment, one carcass ply 11 of a carcass cord 10 arranging at an angle of 75 to 90 degrees to the tire's equator C. The carcass ply 11 has a toroidal main portion 11A straddling between the bead cores 5 and turned up portions 11B turned up around the bead core 5, from inside to outside in the tire axial direction in this embodiment by passing through the radially inner surface of the bead core 5. The turned up portion 11B extends along the axially outer surface of the bead apex rubber 8 extending radially outward from the bead core 5.

The turned-up height H1 from the bead base line BL is smaller than the bead apex height H2, and in this embodiment, smaller than the height HF of the rim flange F. Herein, the bead base line BL refers to the line in the tire axial direction passing the axially outer end point of the bead base surface 4S, and it is the reference line for selecting the rim diameter of applicable rim.

Figure 4:
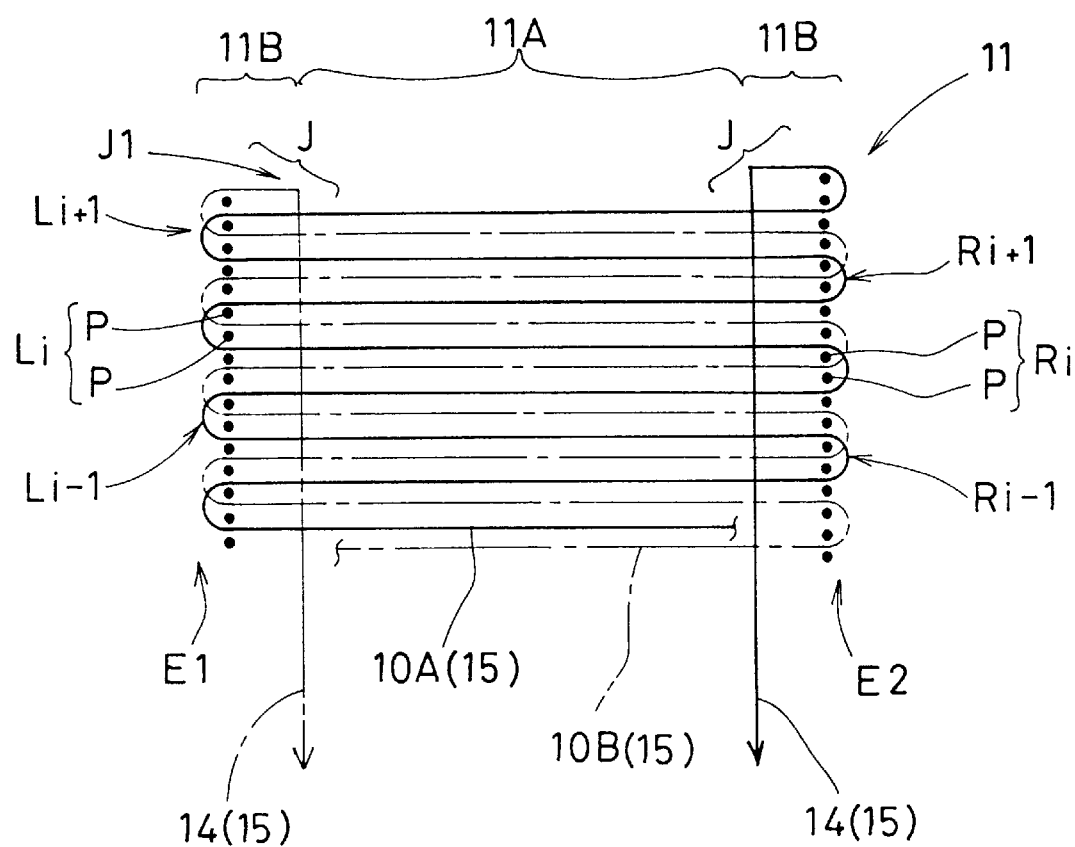
FIG. 4 is a schematic diagram showing an example of zigzag arrangement of carcass cords.

The carcass ply 11 is a endless carcass cord ply wherein at least one carcass cord 10 extends zigzag in the tire's circumferential direction while folded at both ends of the ply 11 alternately to right and left, as shown in FIG. 4 developing its main portion 11A and turned up portion 11B.

In other words, the endless carcass cord ply 11 has a multiplicity of folding points Li (i=1 ... n) arranged at equal intervals in the circumferential direction at one outer end E1 of the ply 11 and a multiplicity of folding points Ri (i=1 ... n) arranged at other outer end E2. The carcass cord 10 is folded alternately around folding points at both outer ends E1, E2 in the sequence of Ri-1, Li-1, Ri, Li, Ri+1, Li+1. In this endless carcass cord ply 11, the number of cords per 5 cm of ply width is about $18/5$ cm to $40/5$ cm, and the carcass cord 10 is arranged substantially parallel without intersecting each other at least in the main portion 11A. If intersecting, a shearing force occurs, which may lead to breakage of cords.

Figure 3:
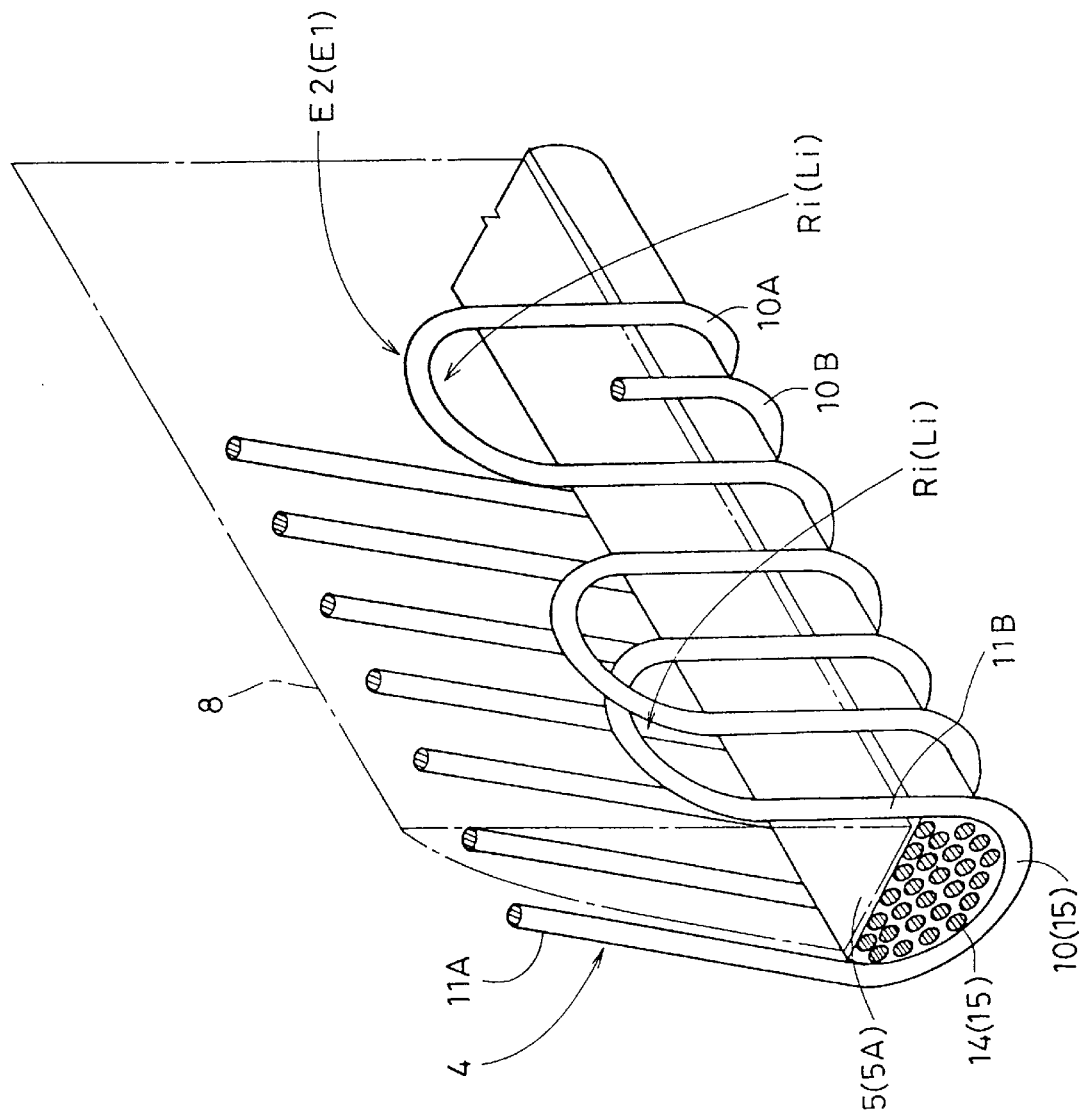
FIG. 3 is a perspective view showing the cord arrangement of carcass together with the bead core.

Meanwhile, since the ply outer ends E1, E2 are terminated at the bead parts 4 or side walls 3 as shown in FIG. 3, the folding points Ri, Li are disposed at both side-portions of the tire 1.

The endless carcass cord ply 11 is formed by using one to several carcass cords 10, and an example of using two cords 10A, 10B is shown in FIG. 4. At this time, 2n point elements are arranged in each one of the outer ends E1, E2 at equal intervals in the circumferential direction, and one folding point is composed of every two point elements P. That is, one carcass cord 10A extends zigzag in the circumferential direction while folding at every two point elements P. The other carcass cord 10B repeats folding at every two point elements P by shifting ½ pitch in the circumferential direction as compared with the one carcass cord 10A, that is, by one point element P. Thus, the carcass cords 10A, 10B are arranged parallel at least in the main portion 11A.

Figure 5:
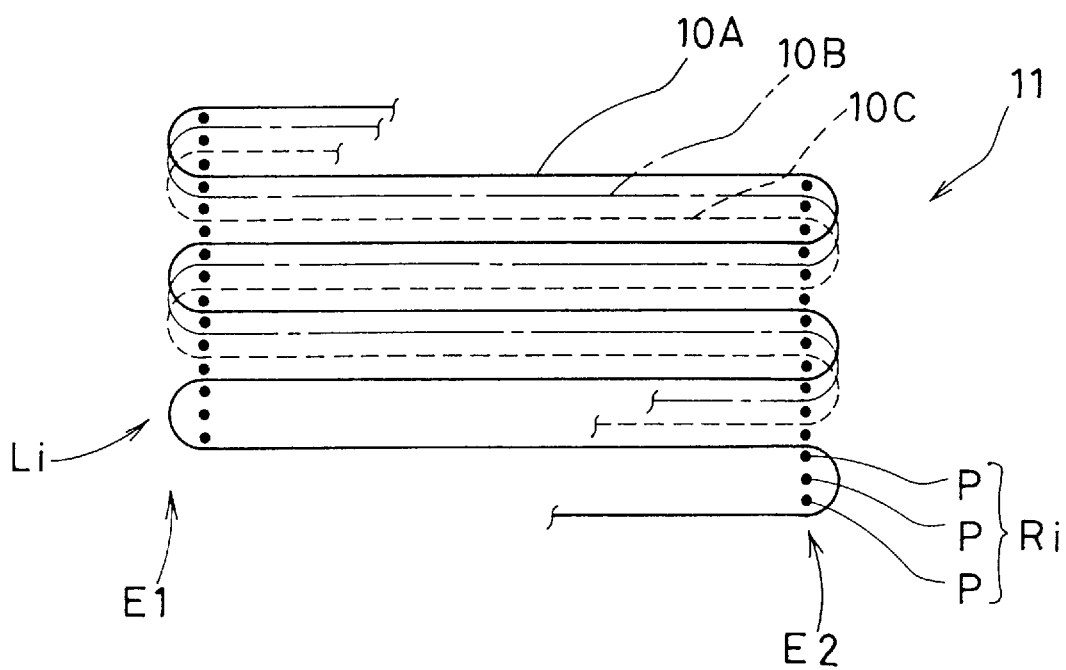
FIG. 5 is a schematic diagram showing other example of zigzag arrangement of carcass cords.

FIG. 5 shows a case of forming a endless carcass cord ply 11 by using three carcass cords 10A, 10B, 10C. In this case, 3n point elements P are arranged in each one of the outer ends E1, E2, and the carcass cords 10A, 10B, 10C are folded at every three point elements P to arrange in a zigzag form, and the zigzag arrangements of the respective cords are shifted to each other by ⅓ pitch, that is, shifted in phase by one point element each. Thus, Three carcass cords 10A, 10B, 10C are arranged parallel.

When forming two to m-sheets of carcass plies 11, the zigzag arrangement of carcass cords 10 is repeated m turns in the circumferential direction.

Figure 6:
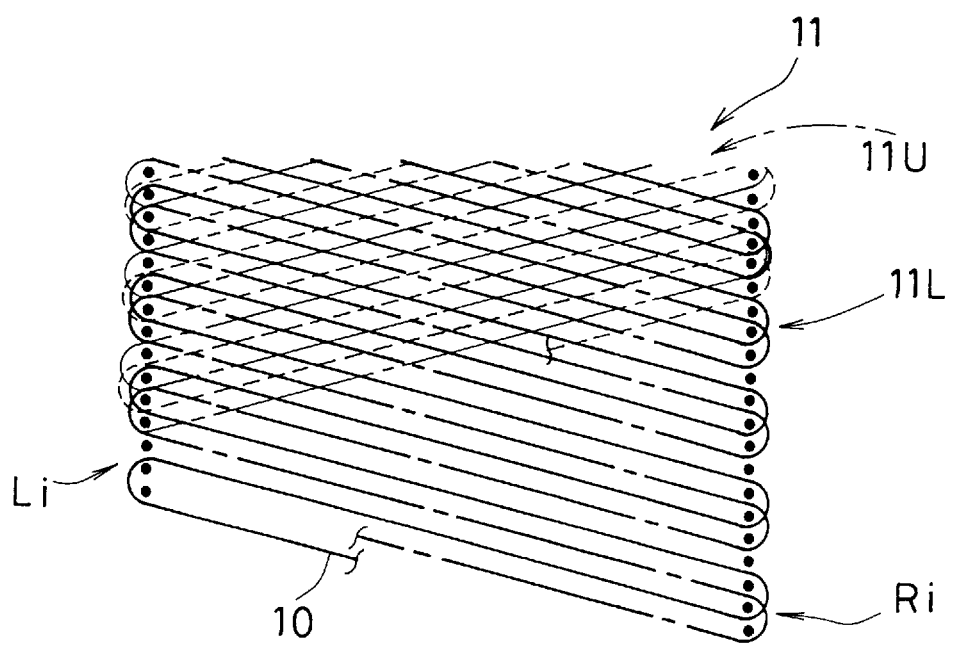
FIG. 6 is a schematic diagram showing a different example of zigzag arrangement of carcass cords.
Figure 7A:
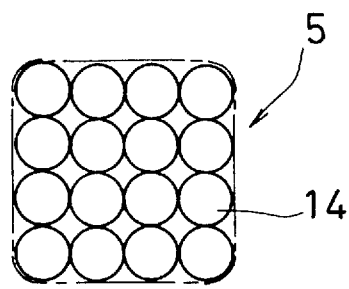
FIGS. 7(A) to 7(F) are schematic sectional views showing examples of sectional shape of the bead core.
Figure 7B:
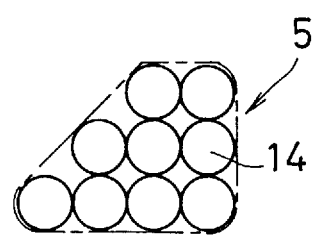
Figure 7C:
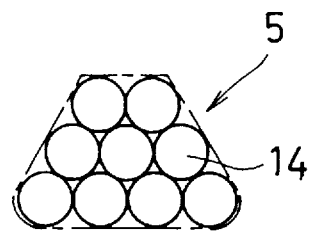
Figure 7D:
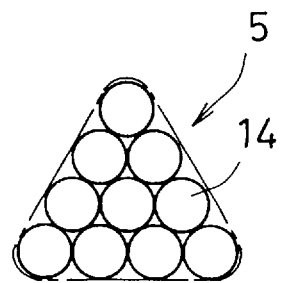
Figure 7E:
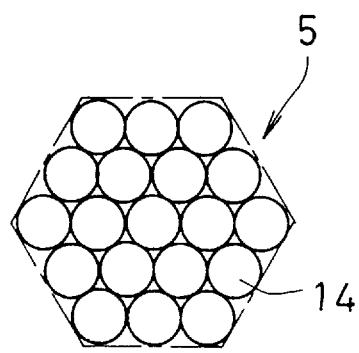
Figure 7F:
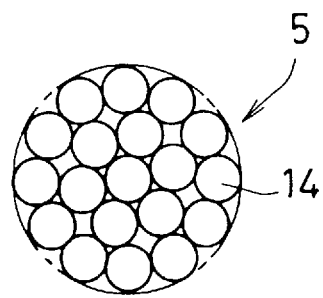

Incidentally, when forming a tire in bias structure, as shown in FIG. 6, the carcass cord 10 is arranged zigzag between folding points Li, Ri at a cord angle of, for example, left-upward inclination of 35 to 60 degrees to the tire's equator C to compose an inner endless carcass cord ply 11L, and in the second turn, by meandering successively at right-upward cord angle of 35 to 60 degrees, an outer endless carcass cord ply 11U is composed.

The bead core 5 has at least an upper bead core portion 5A of so-called single wind type. The upper bead core portion 5A is disposed radially outside the endless carcass cord ply 11 in the bead part 4, and is formed by spirally winding an upper bead cord 14 in one or more stages in the circumferential direction. A continuous cord 15 substantially continuous to the carcass cord 10 is employed as the upper bead cord 14. That is, as shown in FIG. 4, the continuous cord 15 in the zigzag arrangement is continuously transferred to spiral winding from its terminating position J1, thereby forming the endless carcass cord ply 11 and upper bead core portion 5A.

Herein, by "substantially continuous," it means that the upper bead cord 14 and carcass cord 10 are one continuous cord without interruption, or that the upper bead cord 14 and carcass cord 10 are integrally connected to be continuous by joining the interruption by adhesion, welding or the like. In other region than the transition region J from zigzag to spiral winding, if the upper bead cord 14 is interrupted due to material shortage or the like in the process of spiral winding, or the carcass cord 10 is interrupted in the midst of the zigzag arrangement, the spiral winding or folding may be continued from the interrupted end by anew cord without adhering, and the new cord must be the same as the cord before interruption. When connecting integrally by adhesion or welding, if necessary, the upper bead cord 14 and carcass cord 10 may be different in material, thickness, or twisting structure.

Figure 2:
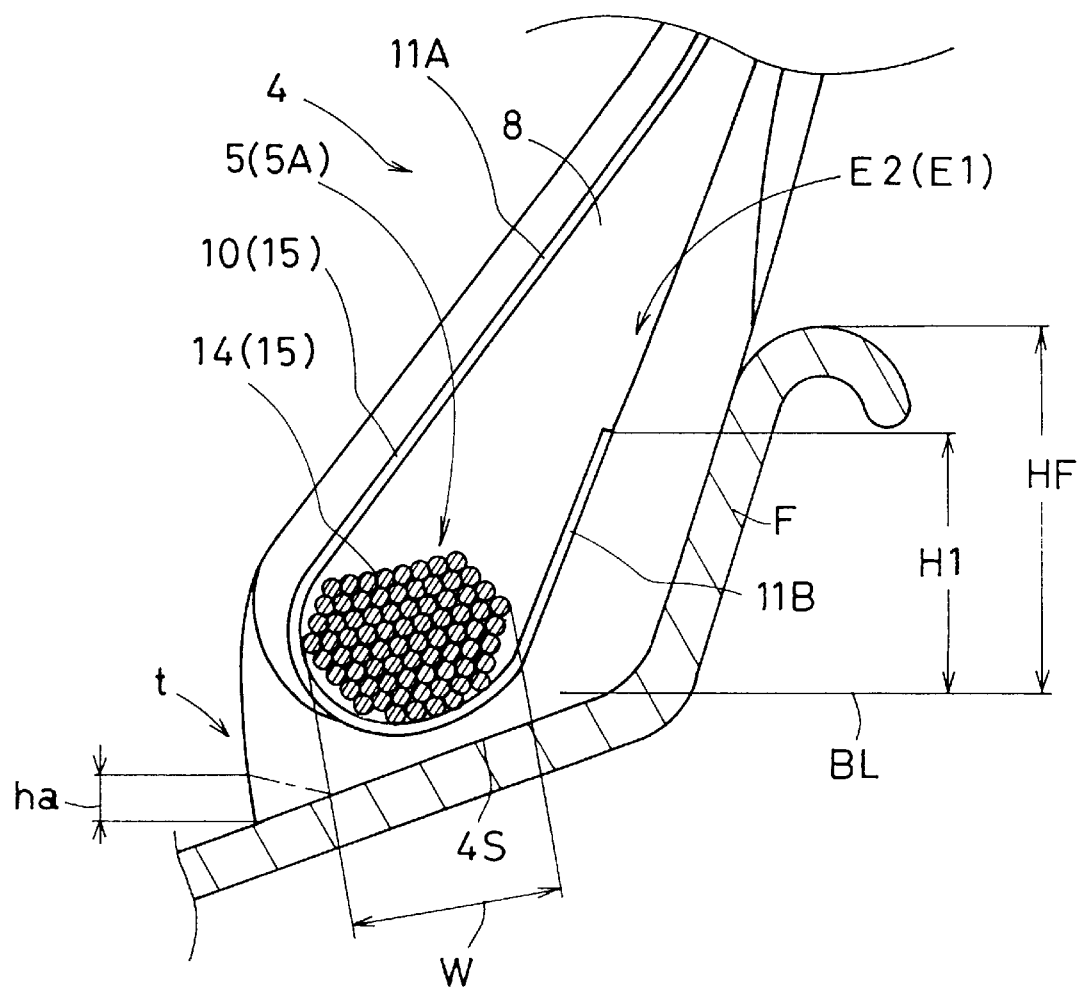
FIG. 2 is a magnified partial sectional view of its bead part.

In this embodiment, the bead core 5 is formed only of the upper bead core portion 5A, and the bead core 5 or upper bead core portion 5A may have various sectional shapes aside from the flat hexagonal shape shown in FIG. 2, such as square, rectangle, trapezoid, parallelepiped, other quadrangle, triangle, hexagon, circle, etc. as shown in FIG. 7(A) to 7(F).

As the continuous cord 15, nylon, rayon, polyester, vinylon, aromatic polyamide, aromatic polyester, high elasticity polyethylene, organic fiber cord, steel, and other metal fiber cord may be used.

In order to reinforce the fitting of bead and rim, and suppress rim deviation, resulting heat generation or deformation of bead base 4S, it is preferred to define the cord initial tensile elasticity E at 1500 kgf/mm$^2$ or more.

Figure 8A:
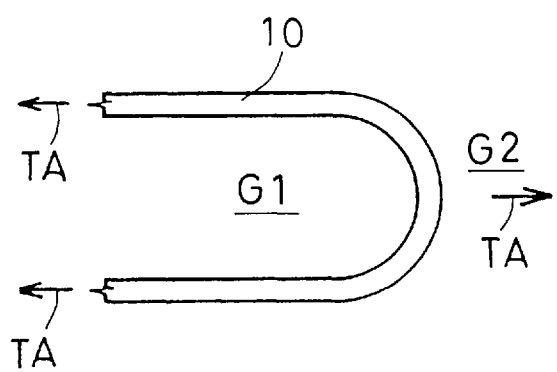
FIGS. 8(A) to 8(B) are schematic sectional views for explaining the action of the carcass ply.
Figure 8B:
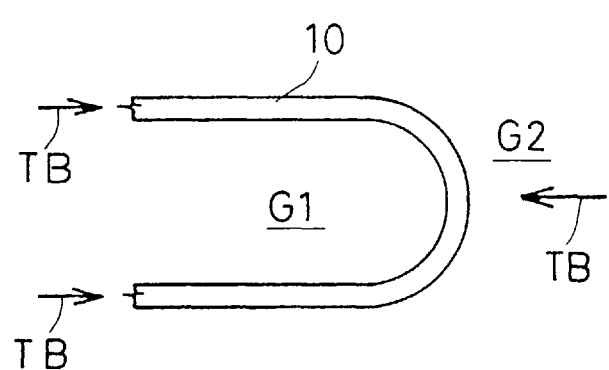

Thus, in this embodiment, since the carcass cord 10 repeats folding in a U-form alternately at the ply outer ends E1, E2, as shown in FIG. 8(A), 8(B), to the tensile force TA acting on the carcass cord 10 by the internal inflating pressure or the like, the load to compress the U-shaped inside rubber G1 resists, and to the compressive force TB acting due to bead deformation, the load for pulling the inside rubber G1 resists, thereby decreasing the stress between the folding end and outside rubber G2. By this U-shape, moreover, the stress itself is dispersed. Still more, the cut end of the cord, which is inferior in adhesion and is a weak point in strength due to stress concentration, is eliminated from the bead 4 since the carcass cord 10 and upper bead cord 14 are continuous.

As a result, the turned-up height H1 can be set smaller than the rim flange height HF while preventing blow-through of the carcass 7, and enhancement of bead durability and notable reduction of weight are achieved. If the turned-up height H1 is higher than the rim flange height HF, the cord looseness of outer ends E1, E2 can be effectively suppressed while eliminating formation of conventional cord reinforcing layer, so that enhancement of bead durability and reduction of weight may be similarly achieved.

As the bead core 5, in addition to the upper bead core portion 5A, a lower bead core portion 5B of single wind type may be also provided radially inside the ply 11, as shown in FIG. 9(A), by spirally winding a lower bead cord 16 in one or more stages in the circumferential direction, and thereby the core strength and core rigidity are enhanced, so that the fitting with the rim may be reinforced. Between the upper and lower bead core portions 5A and 5B, the turned up portion 11B can be supported, and it is effective for preventing blow-through of carcass 7. The lower bead cord 16 may be continuous to the cord 15, but may be also formed as a non-continuous separate cord. For example, when a conventional steel cord is employed for the lower bead core portion 5B, a necessary rim fitting force is obtained even if a low modulus cord of initial tensile elasticity of less than 1500 kgf/mm$^2$ such as nylon and polyester is employed as the continuous cord 15.

As the bead core 4, instead of the lower bead core portion 5B, for example, a core portion SC of so-called tape bead type, wherein a rubber coated tape having four to six parallel cords of steel cords or the like is coiled, may be used. Such the tape bead typed core portion 5C may be provided between the radially inner surface of the upper bead core portion 5A and the endless carcass cord ply 11.

The turned up portion 11B, as in this embodiment shown in FIG. 2 and FIG. 9(A), has a portion 17 projecting axially outwardly from the upper bead core portion 5A by passing through the radially inner surface of the upper bead core portion 5A. The projecting portion 17 is turned up radially outward, and is terminated along the axially outer surface of the upper bead core portion 5A or the axially outer surface of the bead apex rubber 8, or as shown in FIG. 9(B), the projecting portion 17 is turned up in reverse direction, that is, the portion 17 projecting axially inward from the upper bead core portion 5A is turned up radially outward, and is terminated along the axially inner surface of the bead core portion 5A or the bead apex rubber 8 or the like.

As the turned up portion 11B, alternatively as shown in FIG. 9(C), it may be terminated substantially on the radially inner surface of the bead core 5. This case, as shown by single dot chain line in the same drawing, includes that the outer ends E1, E2 are terminated by slightly projecting from the side of the bead core 5 in the tire axial direction.

Figure 10B:
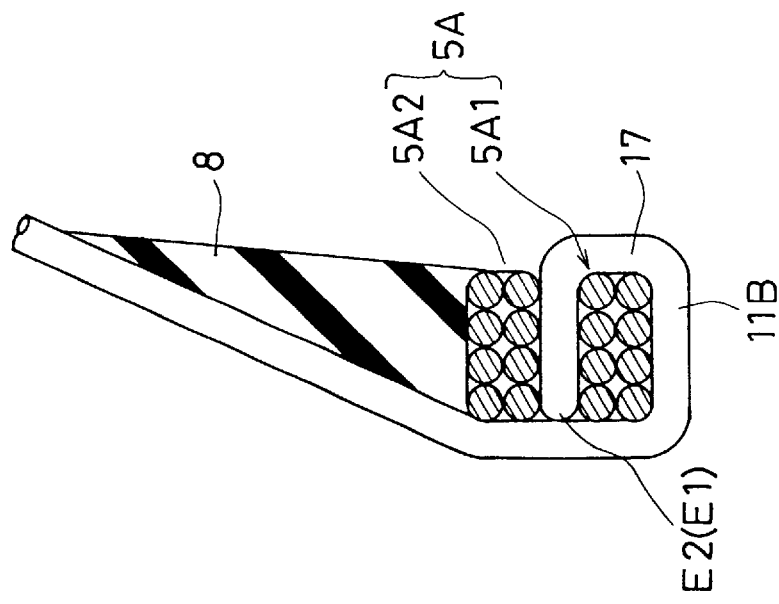
FIGS. 10(A) and 10(B) are schematic sectional views showing other examples of bead structure that can be formed by the invention.
Figure 10A:
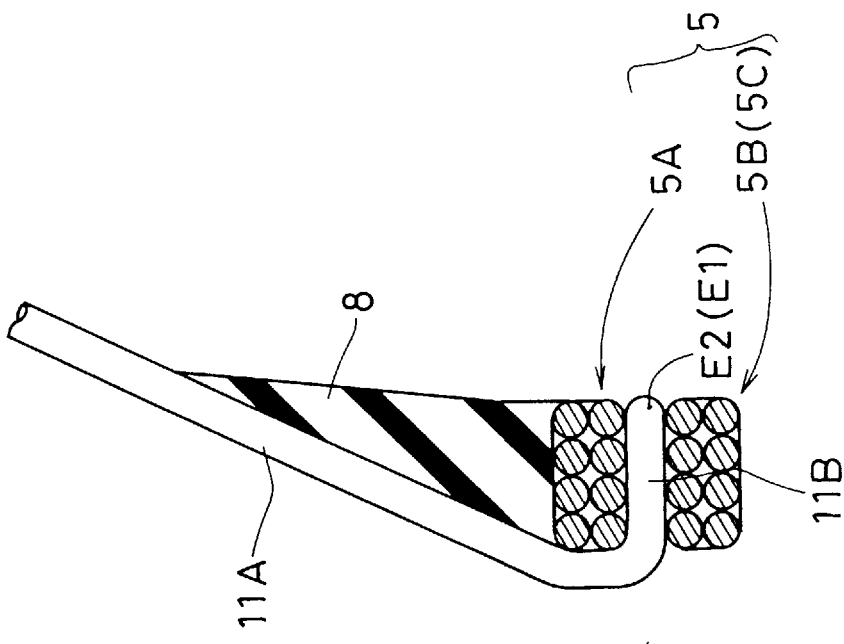

In a further different example of the turned up portion 11B, when the bead core 5 is composed of the upper bead core portion 5A and the lower bead core portion 5B or the core portion 5C, the outer ends E1, E2 of the turned up portion 11B are terminated within the bead core 5. More specifically, as shown in FIG. 10(A), the outer ends E1, E2 of the turned up portion 11B terminated on the radially inner surface of the upper bead core 5A are held between the upper bead core portion 5A and lower bead core portion 5B or the core portion 5C. Or, as shown in FIG. 10(B), the upper bead core portion 5A is divided into a radially inner portion 5A1 and a radially outer portion 5A2, and the portion 17 projecting axially outside through the radially inner surface of the upper bead core portion 5A is turned up radially outward, and the outer ends E1, E2 are terminated by holding between the inner and outer portions 5A1, 5A2. Or, either the portion 5A1 or 5A2 is formed by the core portion 5C, and is terminated by holding between the core portion 5C and other portion 5A1 or 5A2.

In a still different example of the turned up portion 11B, as shown in FIG. 11(A), the portion 17 projecting axially outward from the upper bead core portion 5A is turned up radially outward, and the outer ends E1, E2 are terminated by holding between the upper bead core portion 5A and bead apex rubber 8, or, as shown in FIG. 11(B), passing through between the upper bead core portion 5A and bead apex rubber 8, they are terminated by holding between the carcass main portion 11A and bead apex rubber 8.

Among the above structures of the turned up portion 11B, those designed to terminate the outer ends E1, E2 by holding can securely prevent cord looseness and blow-through of the outer ends E1, E2.

A manufacturing method of such pneumatic tire 1 is described below.

Figure 12A:
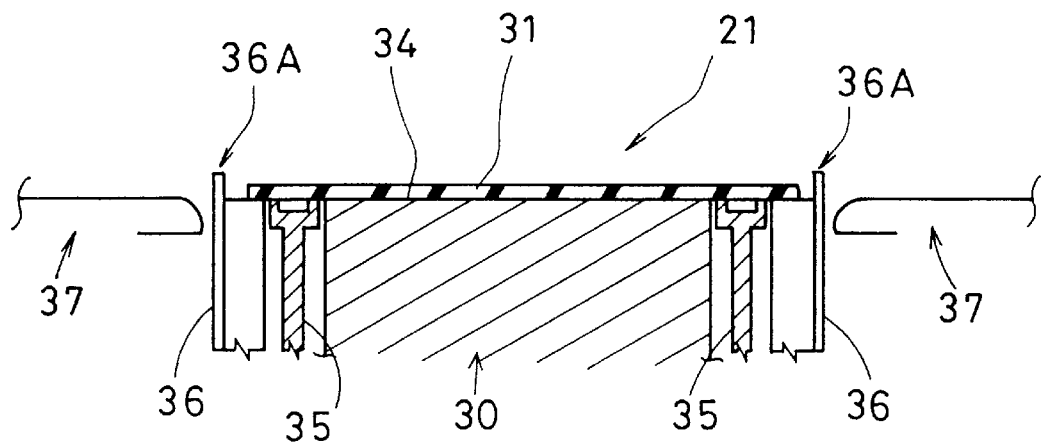
FIGS. 12(A) and 12(B) are schematic diagrams for explaining the inner liner mounting step and carcass ply forming step.
Figure 12B:
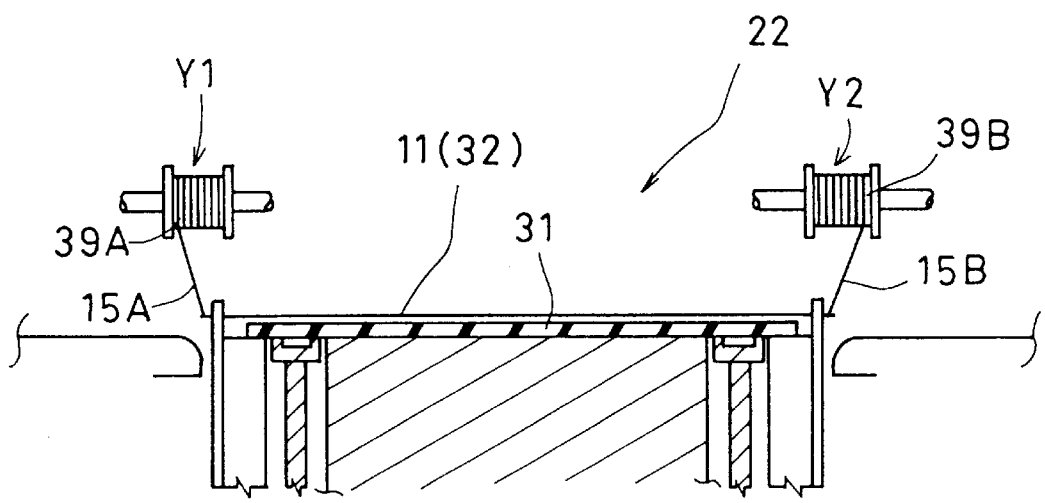
Figure 13A:
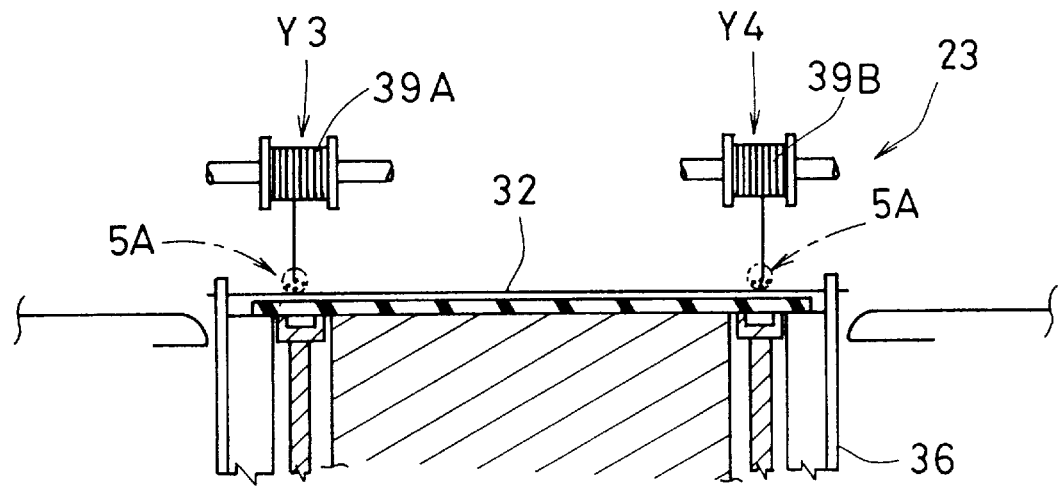
FIGS. 13(A) and 13(B) are schematic diagrams for explaining the bead forming step and junction step.
Figure 13B:
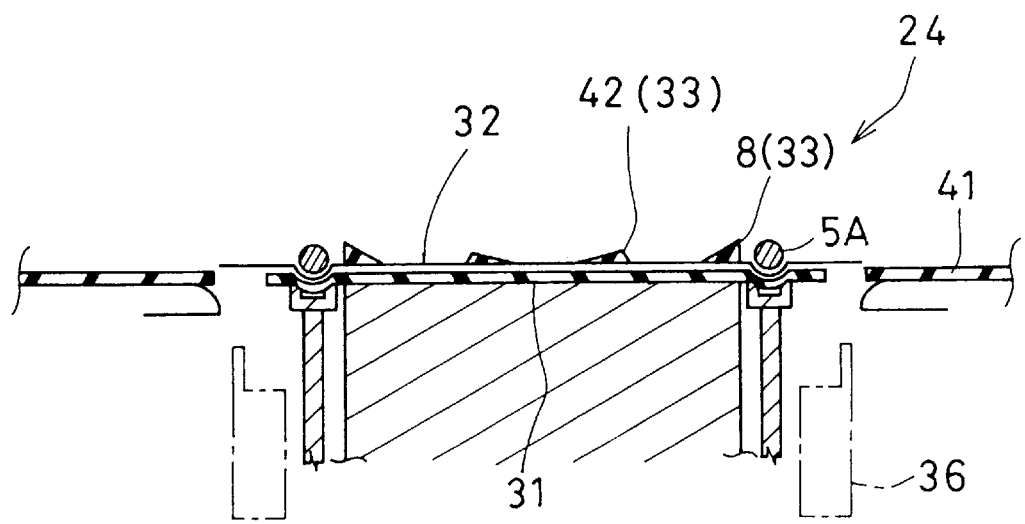
Figure 14:
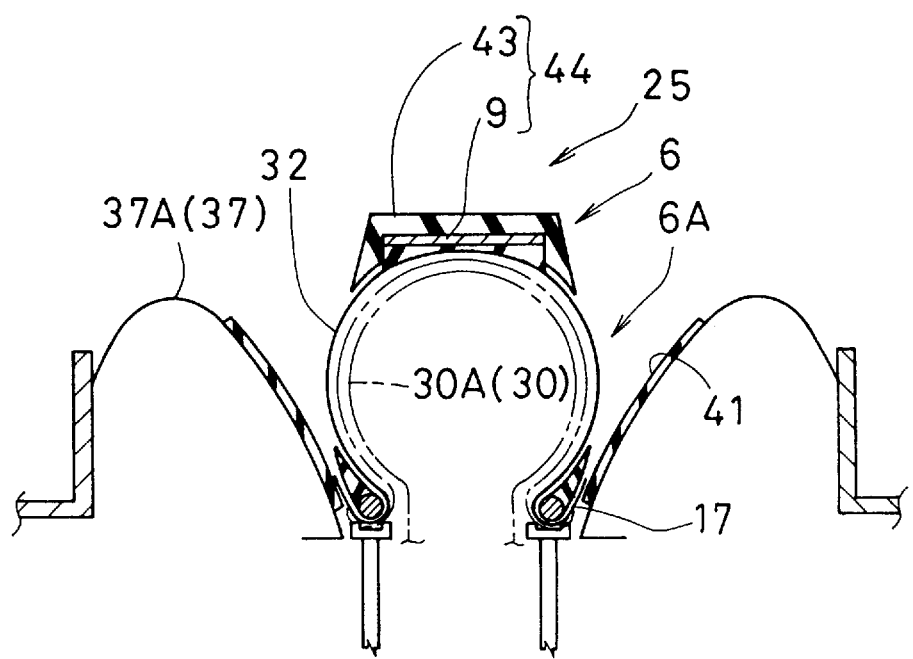
FIG. 14 is a schematic diagram for explaining the inflation step.

The manufacturing method of pneumatic tire comprises, as shown in FIGS. 12 to 14:

- an inner liner mounting step 21 for rolling an inner liner rubber sheet 31 on the outer circumference of a principal tire former 30,
- a carcass ply forming step 22 for forming a tubular ply base body 32 for the endless carcass cord ply 11 on the outer circumference of the inner liner rubber sheet 31,
- a bead forming step 23 for forming bead cores 5, 5 on both sides of the ply base body 32 by spirally winding a continuous cord 15,
- a junction step 24 for mutually joining the ply base body 32 and tire forming member 33, and
- an inflation step 25 for inflating the principal tire former 30 for obtaining the tire main body 6. The steps 21 to 25 are executed in this order in this embodiment.

In the principal tire former 30, a disk shaped flange 36 expandable in diameter is disposed at both ends of a cylindrical drum 34 having a bladder inflating in a toroidal form by inflation with internal pressure, through a bead lock 35 for fixing the bead core 5. At the outer end of the flange 36, protrusions 36A forming the point elements P for folding the cords are disposed at equal intervals in the circumferential direction. At both sides of the principal tire former 30, side formers 37 having inflatable bladders are disposed concentrically.

Therefore, at the inner liner mounting step 21, as shown in FIG. 12(A), the inner liner rubber sheet 31 is rolled in a cylindrical form on the outer circumference of the principal tire former 30 between the flanges 36.

Figure 15:
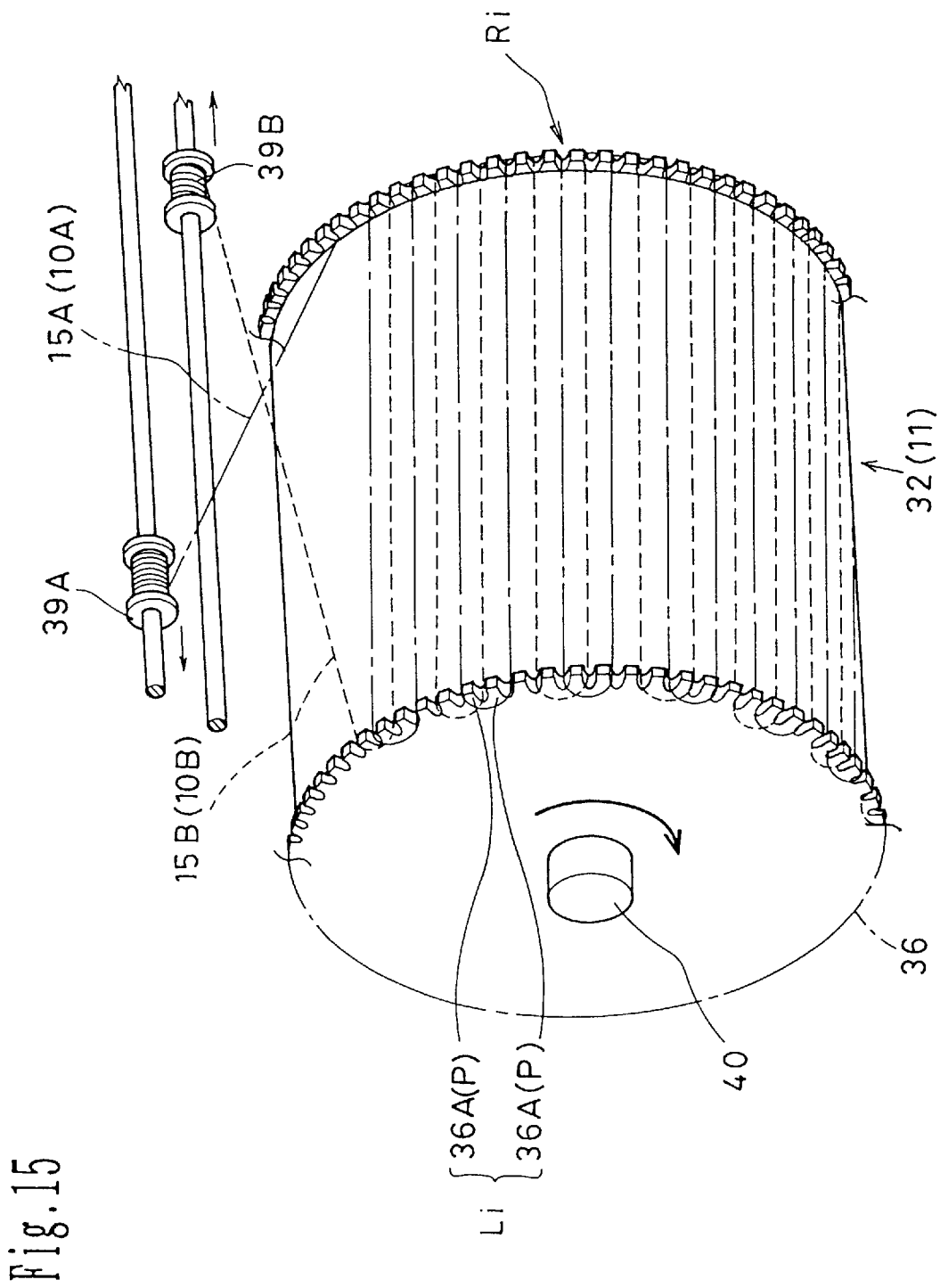
FIG. 15 is a schematic perspective view for explaining the carcass ply forming step.

At the carcass ply forming step 22, as shown in FIG. 12(A) and FIG. 15, using a pair of bobbins 39A, 39B for holding two continuous cords 15A, 15B separately, they are moved reciprocally between one end position Y1 and other end position Y2 outside in the axial direction from the flange 36, passing in parallel to an axial center 40 and in mutually opposite directions. Every time the bobbins 39A, 39B change direction at positions Y1, Y2, the principal tire former 30 repeats intermittent rotations at pitch intervals of 2P. Thus, the continuous cords 15A, 15B are folded sequentially at both folding points Li, R1 alternately, while advancing the folding points Li, Ri in the circumferential direction, thereby forming the tubular ply base body 32 in a number of layers corresponding to the number of turns of the principal tire former 30.

At this time, the continuous cords 15A, 15B are formed parallel to each other without intersecting with each other between the both flanges 36. The bobbins 39A, 39B completing the formation of a required number of layers, or one layer of ply base body 32 in this embodiment are waiting at the positions Y1, Y2. Then, a thin insulation rubber sheet (not shown) is adhered to the outer circumference of the ply base body 32, and the continuous cords 15A, 15B are coated with the inner liner rubber sheet 31 and the insulation rubber sheet, thereby preventing disturbance of array of cords. It is preferred to coat the continuous cords 15A, 15B with rubber or adhesive preliminarily, but after forming the ply base body 32, the outer circumference or the inner circumference of the inner liner rubber sheet 31 may be coated afterwards.

Figure 16:
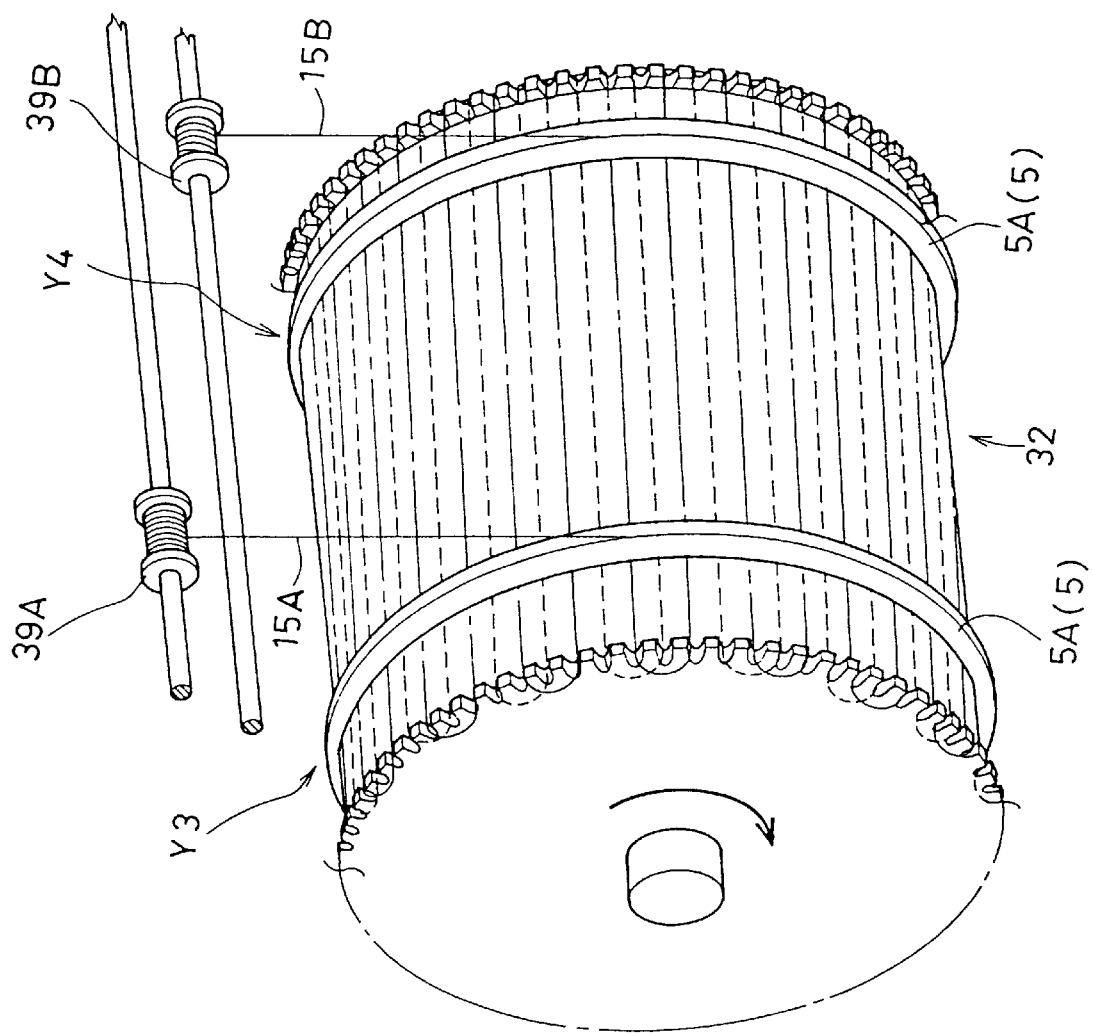
FIG. 16 is a schematic perspective view for explaining the bead forming step.

In the bead forming step 23, as shown in FIG. 13(A) and FIG. 16, the bobbins 39A, 39B are moved to bead core forming positions Y3, Y4 at the inner side in the axial direction from the positions Y1, Y2, and by the reciprocal motion of the bobbins 39A, 39B in the core width W and continuous rotation of the principal tire former 30, the continuous cords 15A, 15B are wound spirally in multiple stages, and the bead core 5 is formed as upper bead core portion 5A at both sides on the outer circumference of the ply base body 32. Incidentally, spiral winding of the continuous cords 15A, 15B may be started from either inside or outside in the tire axial direction of the bead core 5.

When using one continuous cord 15, leaving a portion in the length necessary for forming the bead core 5 at one side, the endless carcass cord ply 11 and bead core 5 on the other sided are formed continuously, and then the bead core 5 of one side is formed by using the remaining length portion. When using three to N continuous cords 15, after forming the endless carcass cord ply 11, the bead core 5 of one side and other side are formed respectively by N/2 cords. In the case of an odd number, one cord is terminated near the array end position J, or the bead cores 5 are formed by combination of (N−1)/2 pieces and (N+1)/2 pieces respectively. From the viewpoint of simplification of former structure and control and enhancement of bead durability, it is preferred to use two continuous cords 15.

At the junction step 24, as shown in FIG. 13(B), tire forming members 33 such as bead apex rubber 8 and rubber cushion 42 are joined mutually to the ply base body 32 with the bead cores 5. At this time, a side wall rubber 41, which is one of the tire forming members 33, is disposed on a side former 37. When joining, it is preferred to press the tire forming member 33 and ply base body 32 lightly by means of a roller or the like.

At the inflation step 25, as shown in FIG. 14, a cylindrical tread ring 44 integrating the belt layer 9 and a tread rubber 43 is set apart radially outward from the ply base body 32 to wait, and then the bladder 30A of the principal tire former 30 and bladder 37A of the side former 37 are inflated respectively.

At this time, as the bladder 30A is inflated, the ply base body 32 inflated in a toroidal form between the bead cores 5, 5 presses the tread ring 55 to form a tire principal portion 6A. The projecting portion 17 of the ply base body 32 projecting axially outward from the outer end of the bead core 5 is turned up together with the side wall rubber 41 as the bladder 37A is inflated, and is adhered to the tire principal portion 6A, thereby forming the tire main body 6 in bed structure shown in FIG. 2 and FIG. 9(A). Prior to the inflation step 25, the flange 36 is contracted in diameter, and is withheld inside in the radial direction from the cylindrical drum 34, so that the projecting portion 17 is released to enable turning.

At the bead forming step 23, without forming the projecting portion 17, the continuous cords 15A, 15B may be wound by approximately aligning with the outer end of the ply base body 32. That is, by keeping the ply outer ends E1, E2 aligned with the axially outer end of the bead core 5, or slightly inward or outward from the outer end, the tire main body 6 of bead structure shown in FIG. 9(C) can be formed.

Prior to the junction step 24, meanwhile, the bladder 37A of the side former 37 may be inflated, the projection 17 is turned to the radially outer surface of the bead core 5, and the bead apex rubber 8 is adhered, so that the tire main body 6 in the bead structure as shown in FIG. 11(A), 11(B) may be formed.

Figure 17:
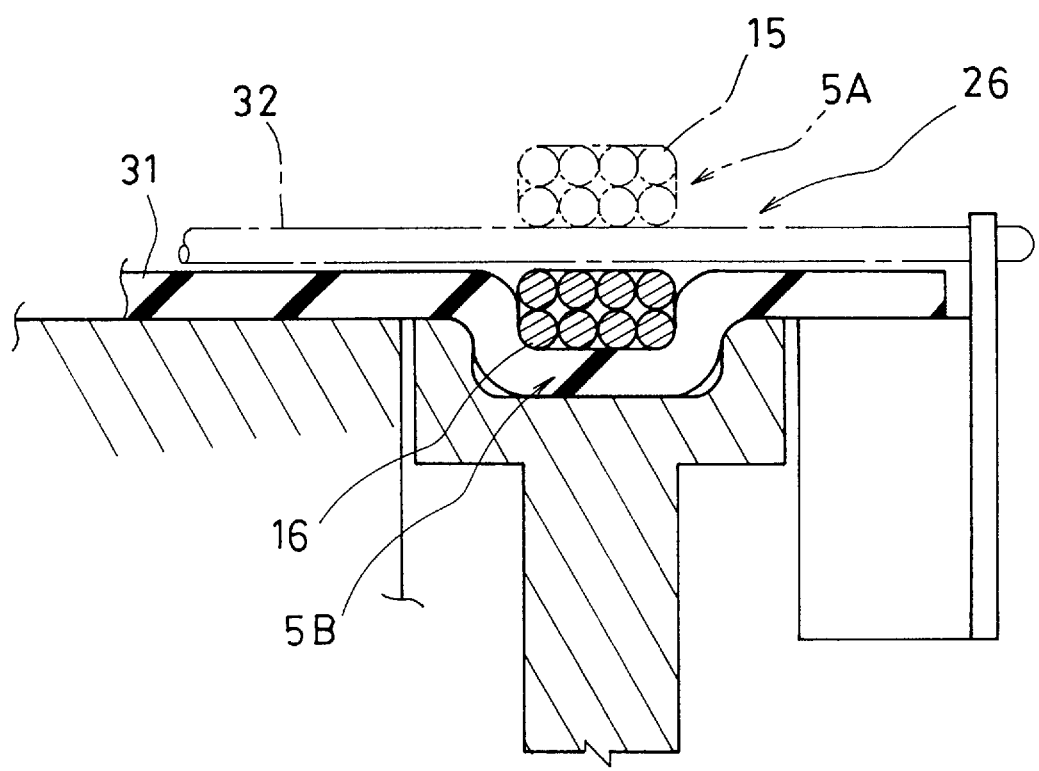
FIG. 17 is a schematic sectional view for explaining the lower bead core portion forming step.

Or, as shown in FIG. 17, the carcass ply forming step 22 may be preceded by a lower bead core forming step 26 for turning the lower bead cord 16 spirally on the inner liner rubber sheet 31, and thereby the lower bead core portion 5B may be formed freely. At this time, as the lower bead cord 16, either same cord continuous with the continuous cord 15, or a separate cord not continuous may be used. The lower bead core forming step 26 may be replaced by a tape bead forming step of forming the core portion 5C of tape bead type by overlaying the band of the cords.

Figure 18:
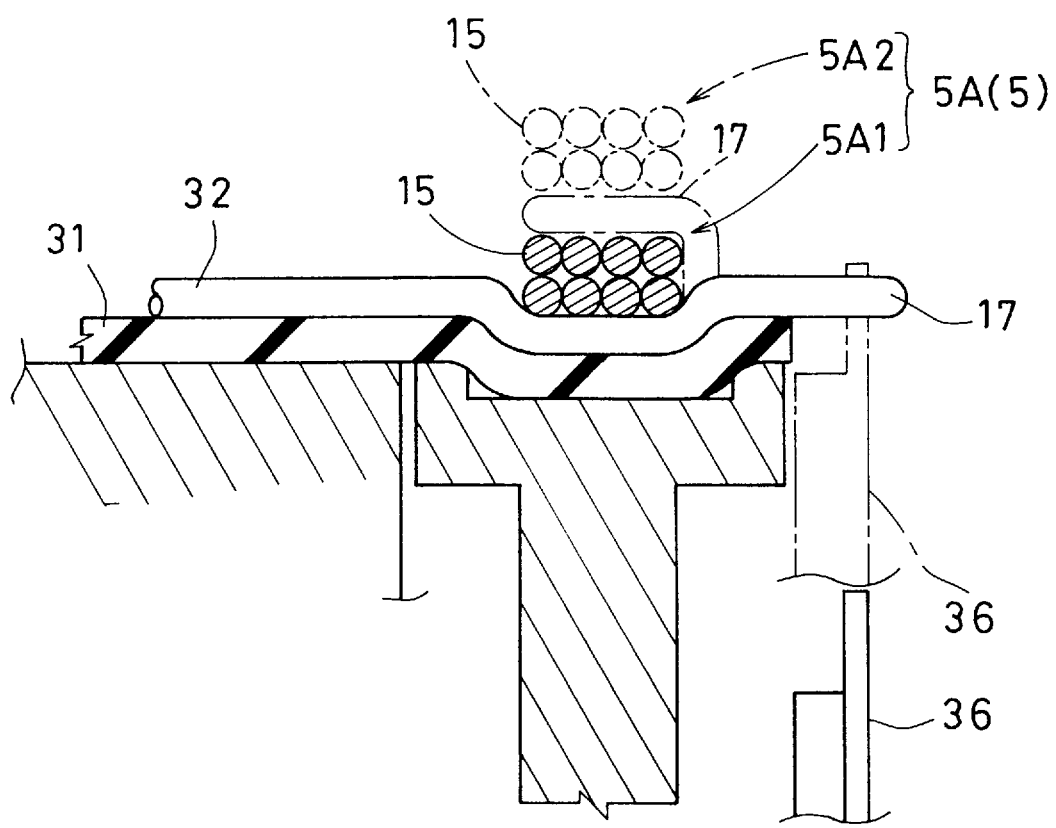
FIG. 18 is a schematic sectional view for explaining an example of turning up step of both ends of carcass ply.

As shown in FIG. 18, at the bead forming step 23, the lower core portion 5A1 is formed by spirally winding continuous cord 15 on the ply base body 32 in about a half number of stages, the projection 17 is turned up on the lower core portion 5A1 by inflating the side former 37, and the continuous cord 15 is wound spirally to form the upper core portion 5A2. As a result, the tire main body 6 in bead structure shown in FIG. 10(B) is formed. Or, by executing the tape bead forming step in the midst of bead forming step 23, either one of the core portions 5A1, 5A2 may be formed in the core portion 5C.

Figure 19:
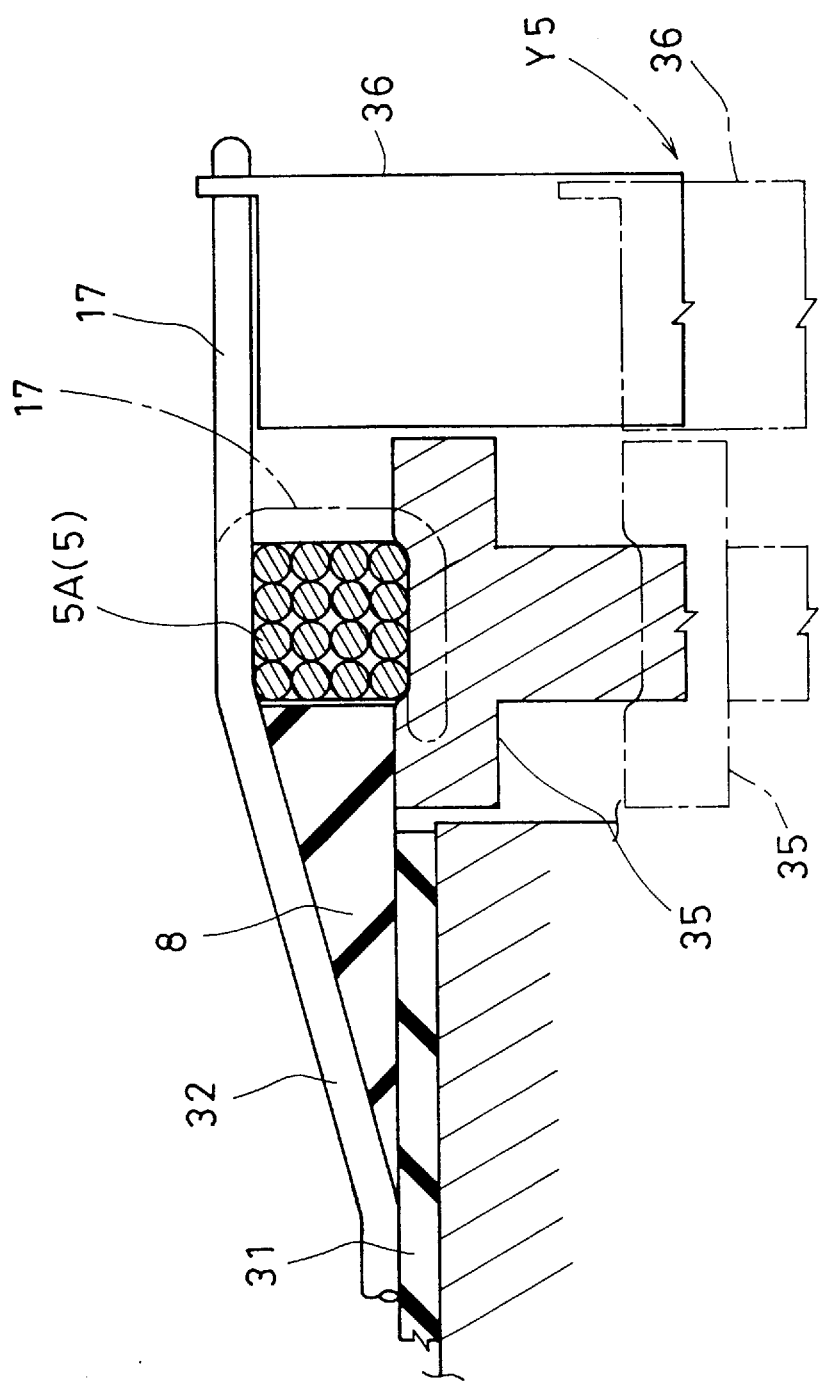
FIG. 19 is a schematic sectional view for explaining other example of turning up step of both ends of carcass ply.

FIG. 19 shows forming means of bead structure shown in FIG. 9(B). As shown in the drawing, the inner liner rubber sheet 31 is formed between the bead locks 35, 35, and the bead core 5 is formed on the bead locks 35. The bead apex rubber 8 extending on the inner liner rubber sheet 31 is disposed on the bead core 5, and the ply base body 32 in carcass ply forming step 22 is formed thereon. Therefore, at the bead forming step 23, in this embodiment, the bead core 5 is formed prior to the bead base body 32 at the inner side of the ply base body 32. After the bead clock 35 and flange 36 are contracted in diameter to the position Y waiting at the inner side in the radial direction, the projection 17 is turned from outside to inside in the turned process 26. Later, by disposing cushion rubber 42 and other tire forming members 33, junction step 24 for joining by pressing and inflation step 25 are executed sequentially.

At the carcass ply forming step 22, the carcass play 11 in the bias structure as shown in FIG. 6 can be formed, and at this time, at the junction step 24, instead of the tread ring 44, the breaker and tread rubber at cord angle close to the carcass ply are joined to the middle of the ply base body 32 as one of the tire forming member 33. By the inflation step 25, the breaker and tread rubber are inflated in a toroidal form together with the ply base body 32, thereby forming the tire main body 6 in bias structure. Meanwhile, to enhance the steering stability by raising the bead rigidity, a reinforcing layer made of organic fiber or metal fiber cord may be added to the bead 4.

EXAMPLES

According to the above manufacturing method, radial tires for heavy load in the composition shown in FIG. 1 were experimentally fabricated in the specifications in Tables 1 and 2 in the tire size of 11R22.5. And trial tires were tested and compared in the bead durability (bead damage), bead heat generation, bead bases deformation, and tire weight.

The test conditions were as follows.

1) Bead heat generation

Test tires were installed in deep bottom rim of 15 degrees in the size of 22.5×8.25, and driven on a drum in the conditions of internal inflation pressure of 8.00 $kgf/cm^2$, load weight of 9000 kg and speed of 20 km/h. The bead surface temperature was measured at every 1000 km of running distance, and the mean was expressed in index with conventional tire as 100. The smaller value means the lower heat generation, that is, excellent.

2) Bead durability (bead damage)

After driving on the drum for 5000 km in the same conditions, the tires were disassembled, and the presence or absence of loose plies was investigated. In Tables 1 and 2, ○ indicates absence of loose plies, Δ means occurrence of looseness at the end of the turned up portion of carcass ply, and X indicates occurrence of separation of carcass.

3) Bead base deformation

As indicated by single dot chain line in FIG. 2, after driving on the drum for 5000 km in the same conditions, deformation height ha of lifting deformation of the tow t of the bead base of the tire was measured, and expressed in the index with the tire before driving taken as 100. The larger value means the smaller deformation, that is, excellent.

4) Tire weight

The weight of test tires was expressed in index with the conventional tire as 100. The smaller value means the lighter weight, that is, excellent.

As shown in Tables 1 and 2, in the tires of the embodiments formed according to the manufacturing method of the invention, if the bead core and carcass are made of low modulus cords such as nylon and polyester, although inferior in the bead heat generation and bead deformation to the conventional tires made of steel cords, the bead durability (bead damage) is enhanced. In particular, when using the organic fiber cords of which initial tensile elasticity is 1500 $kgf/mm^2$ or more, the bead heat generation and bead deformation are also equivalent to or superior to the performance of the conventional tire of steel cords (initial tensile elasticity about 19000 $kgf/mm^2$).

TABLE 1

Figure 20:
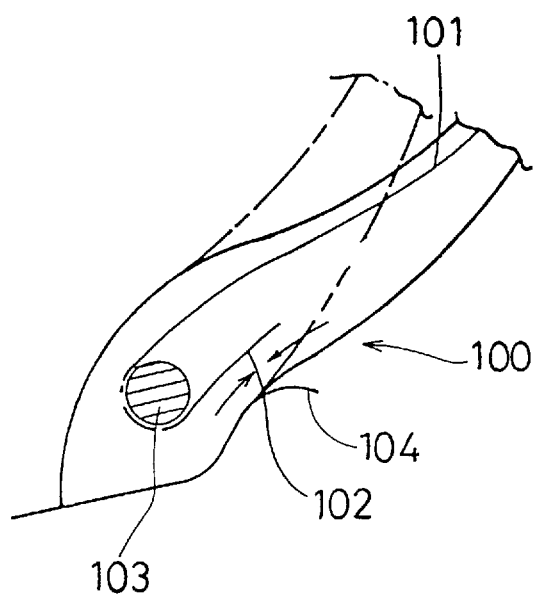
FIG. 20 is a schematic sectional view for explaining the stress acting on the bead when the tire is deformed.

|  | Conventional 1 | Conventional 2 | Embodiment 1 | Embodiment 2 | Embodiment 3 | Embodiment 4 | Embodiment 5 |
|---|---|---|---|---|---|---|---|
| Carcass |  |  |  |  |  |  |  |
| Number of plies | 1 | 1 | 1 | 1 | 1 | 1 | 1 |
| Cord arrangement | Parallel | Parallel | Zigzag (endless) | Zigzag (endless) | Zigzag (endless) | Zigzag (endless) | Zigzag (endless) |
| Turned up structure | FIG. 20 | FIG. 20 | FIG. 2 | FIG. 2 | FIG. 2 | FIG. 2 | FIG. 2 |
| Cord structure | Steel 3/.20 + 7/.23 | Kevlar 3000d//2/2 | Kevlar 3000d//2/2 | Polyester 3000d//2/2 | Polyester 3000d//2/2 | Polyester 3000d//2/2 | Nylon 1890d//2/2 |
| Number of twists (turns/10 cm) | 7 | 10 | 10 | 10 | 6 | 4 | 10 |
| Cord density (cords/5 cm) | 20 | 20 | 20 | 20 | 20 | 20 | 20 |
| Tensile elasticity E (kgf/mm$^2$) | 19,000 | 2,000 | 2,000 | 900 | 850 | 800 | 400 |
| Bead core |  |  |  |  |  |  |  |
| Core structure | Core body 5C (single wind) | Core body 5C (single wind) | Upper bead core portion 5A only | Upper bead core portion 5A only | Upper bead core portion 5A only | Upper bead core portion 5A only | Upper bead core portion 5A only |
| Cord structure | Steel φ 1.55 mm | Steel φ 1.55 mm | Kevlar 3000d//2/2 | Polyester 3000d//2/2 | Polyester 3000d//2/2 | Polyester 3000d//2/2 | Nylon 1890//2/2 |
| Number of twists (turns/10 cm) | — | — | 10 | 10 | 6 | 4 | 10 |
| Number of cords | 57 | 57 | 65 | 65 | 65 | 65 | 88 |
| Tensile elasticity E (kgf/mm$^2$) | 19,000 | 19,000 | 2,000 | 900 | 850 | 800 | 400 |
| Continuity of carcass cord and bead cord | Non-continuous | Non-continuous | Continuous | Continuous | Continuous | Continuous | Continuous |
| Bead apex height H2 (mm) | 90 | 90 | 30 | 30 | 30 | 30 | 30 |
| Carcass turned-up height H1 (mm) | 40 | 40 | 20 | 20 | 20 | 20 | 20 |
| Rim flange height HF (mm) | 12.7 | 12.7 | 12.7 | 12.7 | 12.7 | 12.7 | 12.7 |
| Ratio H2/H1 | 0.4 | 0.4 | 0.7 | 0.7 | 0.7 | 0.7 | 0.7 |
| Bead durability (bead damage) | x | x | Δ | Δ | Δ | Δ | Δ |
| Bead heat generation | 100 | 100 | 100 | 120 | 110 | 110 | 150 |
| Bead base deformation | 98 | 98 | 95 | 95 | 95 | 95 | 80 |
| Tire weight | 100 | 94 | 85 | 85 | 85 | 85 | 85 |

*Kevlar is a trademark of aromatic polyamide.

TABLE 2

|  | Embodiment 6 | Comparison | Embodiment 7 | Embodiment 8 | Embodiment 9 | Embodiment 10 |
|---|---|---|---|---|---|---|
| Carcass |  |  |  |  |  |  |
| Number of plies | 1 | 1 | 1 | 1 | 1 | 1 |
| Cord arrangement | Zigzag (endless) | Zigzag (endless) | Zigzag (endless) | Zigzag (endless) | Zigzag (endless) | Zigzag (endless) |
| Turned up structure | FIG. 2 | FIG. 2 | FIG. 2 | FIG. 10(B) | FIG. 10(B) | FIG. 10(B) |
| Cord structure | Kevlar 3000d//2/2 | Kevlar 3000d//2/2 | Kevlar 3000d//2/2 | Kevlar 3000d//2/2 | Steel 3/.20 d + 7/.23 | Kevlar 3000d//2/2 |
| Number of twists (turns/10 cm) | 10 | 10 | 10 | 10 | 7 | 10 |
| Cord density (cords/5 cm) | 20 | 20 | 20 | 20 | 20 | 20 |
| Tensile elasticity E (kgf/mm$^2$) | 2,000 | 2,000 | 2,000 | 2,000 | 19,000 | 2,000 |
| Bead core |  |  |  |  |  |  |
| Core structure | Upper bead core portion 5A only | Upper bead core portion 5A only | Upper bead core portion 5A only | Upper bead core portion 5A only | Upper bead core portion 5A only | Core body 5C + upper bead core portion 5A (single wind) |
| Cord structure | Kevlar 3000d//2/2 | Kevlar 3000d//2/2 | Kevlar 3000d//2/2 | Kevlar 3000d//2/2 | Steel 3/.20d + 7/.23 | Steel:Kevlar φ 1.55 mm: 3000d//2/2 |
| Number of twists (turns/10 cm) | 10 | 10 | 10 | 10 | 7 | —:10 |
| Number of cords | 65 | 65 | 65 | 65 | 65 | 15:43 |
| Tensile elasticity E (kgf/mm$^2$) | 2,000 | 2,000 | 2,000 | 2,000 | 2,000 | 19,000:2,000 |
| Continuity of carcass cord and bead cord | Continuous | Non-continuous | Continuous | Continuous | Continuous | Partially continuous |
| Bead apex height H2 (mm) | 30 | 30 | 30 | 30 | 30 | 30 |
| Carcass turned-up height H1 (mm) | 36 | 12 | 12 | 6 | 6 | 6 |
| Rim flange height H2 (mm) | 12.7 | 12.7 | 12.7 | 12.7 | 12.7 | 12.7 |
| Ratio H2/H1 | 1.2 | 0.4 | 0.4 | 0.2 | 0.2 | 0.2 |
| Bead durability (bead damage) | Δ | x | ○ | ○ | ○ | ○ |
| Head heat generation | 100 | 90 | 90 | 80 | 80 | 75 |

TABLE 2-continued

|  | Embodiment 6 | Comparison | Embodiment 7 | Embodiment 8 | Embodiment 9 | Embodiment 10 |
| --- | --- | --- | --- | --- | --- | --- |
| Bead base deformation | 95 | 95 | 95 | 95 | 98 | 98 |
| Tire weight | 86 | 83 | 83 | 82 | 98 | 83 |

*Kevlar is a trademark of aromatic polyamide.

What is claimed is:

1. A pneumatic tire comprising a carcass extending from a tread through side-walls to a bead core in each of two bead parts and having at least one endless carcass cord ply, said endless carcass cord ply provided with a multiplicity of folding points arranged in the circumferential direction of the tire at both outer ends of the endless carcass cord ply, and formed by at least two carcass cords extending zigzag in the circumferential direction of the tire while being folded around the respective folding points of both outer ends alternately right and left, and said bead core having an upper bead core portion disposed radially outside said endless carcass cord ply in the bead part and formed by an upper bead cord being substantially continuous to said carcass cord and spirally wound in one or more layers in the circumferential direction of the tire, wherein said endless carcass cord ply has folded portions of cord folded only around the respective folding points, and both outer ends of the endless carcass cord ply have overlapping portions at which said folded portions of cord adjacent to each other in the circumferential direction of the tire are overlapped and non-overlapping portions at which said folded portions of cord adjacent to each other in the circumferential direction of the tire are spaced without overlap, said at least two carcass cords are arranged substantially parallel without overlap in a ply main portion straddling between the bead cores, and each of said both outer ends of the endless carcass cord ply is projected from the bead core in the axial direction of the tire so as to form a protecting portion being turned up radially outwardly and terminated between the bead core and the bead apex rubber or on a side surface of the bead apex rubber positioned radially outside the bead core.

2. The pneumatic tire of claim 1, wherein said bead core has a lower bead core portion disposed radially inside said endless carcass cord ply in the bead part and formed by a lower bead cord being either substantially continuous to or discontinuous to said carcass cord and spirally wound in one or more layers in the circumferential direction of the tire.

3. The pneumatic tire of claim 1, wherein said both outer ends of the endless carcass cord ply are projected from the bead core in the tire axial direction so as to form a projecting portion, said projecting portion turned up radially outwardly, and passing through between the bead core and a bead apex rubber positioned radially outside the bead core, and terminated between the bead core and the bead apex rubber or on a side surface of the bead apex rubber.

4. The pneumatic tire of claim 1, wherein said at least two carcass cords are two.

5. The pneumatic tire of claim 1, wherein said at least two carcass cords are two, and each one of the two carcass cords forms said upper bead core respectively.

6. The pneumatic tire of claim 1, wherein the tire is supported on a rim having a rim flange and the height of said projecting portion of the endless carcass cord ply is greater than the rim flange height.

* * * * *